United States Patent
Pei et al.

(10) Patent No.: US 11,315,343 B1
(45) Date of Patent: Apr. 26, 2022

(54) ADVERSARIAL OPTIMIZATION METHOD FOR TRAINING PROCESS OF GENERATIVE ADVERSARIAL NETWORK

(71) Applicants: UNIVERSITY OF SHANGHAI FOR SCIENCE AND TECHNOLOGY, Shanghai (CN); YUNWU NETLINK (SUZHOU) INTELLIGENT TECHNOLOGY CO., LTD., Suzhou (CN)

(72) Inventors: Songwen Pei, Shanghai (CN); Tianma Shen, Shanghai (CN)

(73) Assignee: University of Shanghai for Science and Technology, Shanghai (CN)

( * ) Notice: Subject to any disclaimer, the term of this patent is extended or adjusted under 35 U.S.C. 154(b) by 0 days.

(21) Appl. No.: 17/288,566

(22) PCT Filed: Sep. 29, 2020

(86) PCT No.: PCT/CN2020/118698
§ 371 (c)(1),
(2) Date: Apr. 25, 2021

(87) PCT Pub. No.: WO2021/169292
PCT Pub. Date: Sep. 2, 2021

(30) Foreign Application Priority Data

Feb. 24, 2020 (CN) .......................... 202010113638.1

(51) Int. Cl.
*G06V 10/774* (2022.01)
*G06N 3/04* (2006.01)
*G06F 17/13* (2006.01)
(52) U.S. Cl.
CPC ............ *G06V 10/774* (2022.01); *G06F 17/13* (2013.01); *G06N 3/0454* (2013.01)

(58) Field of Classification Search
CPC ...... G06V 10/774; G06V 20/56; G06V 20/10; G06F 17/13; G06N 3/0454; G06N 3/0472;
(Continued)

(56) References Cited

U.S. PATENT DOCUMENTS 10,496,809 B1 * 12/2019 Pham ..................... G06N 20/00
10,832,092 B2 * 11/2020 Shaubi .................. G06K 9/628
(Continued)

FOREIGN PATENT DOCUMENTS

CN   110059793 A   7/2019
CN   111401138 A   7/2020

OTHER PUBLICATIONS

International Search Report in PCT/CN2020/118698, issued by ISA, dated Dec. 30, 2020.
(Continued)

*Primary Examiner* — Michael S Osinski
(74) *Attorney, Agent, or Firm* — Zhu Lehnhoff LLP

(57) ABSTRACT

The invention relates to an adversarial optimization method for the training process of generative adversarial network. According to the adversarial optimization method for the training process of generative adversarial network, the optimal transmission problem is transformed into solving the elliptic Monge-Ampere partial differential equation (MAPDE) in the generator G. To solve MAPDE of n (n>3) dimensions, the Neumann boundary conditions are improved and the discretization of MAPDE is extended to obtain the optimal mapping between a generator and a discriminator, which constitutes the adversarial network MAGAN. In the process of training the defence network, by overcoming the loss function of the optimal mapping, the defence network can obtain a maximum distance between the two measurements and obtain filtered security samples.

(Continued)

The effective attack method of GANs is successfully established, with the precision improved by 5.3%. In addition, the MAGAN can be stably trained without adjusting hyperparameters, so that the accuracy of target classification and recognition system for unmanned vehicle can be well improved.

2 Claims, 4 Drawing Sheets

(58) Field of Classification Search
CPC .......... G06N 3/08; G06N 3/088; G06N 3/084; G06N 3/0445; G06N 3/04; G06T 2207/20081; G06T 2207/20084; G06T 2207/20076; G06T 2207/10004; G06T 2207/10016; G06T 2207/10101; G06K 9/6256; G06K 9/6262; G06K 9/6271; G06K 9/6272; G06K 9/628; G06K 9/6215; G06K 9/6234; G06K 9/6267; G06K 9/6277
See application file for complete search history.

(56) References Cited

U.S. PATENT DOCUMENTS

| | | | |
|---|---|---|---|
| 11,120,526 B1* | 9/2021 | Demyanov | G06T 5/10 |
| 2019/0147343 A1 | 5/2019 | Lev et al. | |
| 2019/0155284 A1* | 5/2019 | Zavesky | G06V 20/56 |
| 2019/0197358 A1* | 6/2019 | Madani | G06N 3/0481 |
| 2019/0251612 A1* | 8/2019 | Fang | G06T 11/00 |
| 2019/0295223 A1* | 9/2019 | Shen | G06V 20/10 |
| 2019/0325597 A1* | 10/2019 | Chakravarty | G06T 7/74 |
| 2020/0175329 A1* | 6/2020 | Malaya | G06K 9/6271 |
| 2020/0193269 A1* | 6/2020 | Park | G06K 9/6271 |
| 2020/0242412 A1* | 7/2020 | Katoh | G06T 7/0012 |
| 2020/0242481 A1* | 7/2020 | Kim | G06N 3/0454 |
| 2020/0286208 A1* | 9/2020 | Halupka | G06N 3/088 |
| 2020/0388014 A1* | 12/2020 | Hiasa | G06N 20/00 |
| 2020/0394451 A1* | 12/2020 | Baijal | G06K 9/6227 |
| 2020/0394475 A1* | 12/2020 | Akhazhanov | G06K 9/6269 |
| 2020/0410335 A1* | 12/2020 | Gu | G06N 3/08 |
| 2021/0049452 A1* | 2/2021 | Fan | G06N 3/08 |
| 2021/0089903 A1* | 3/2021 | Murray | G06N 3/0454 |
| 2021/0104021 A1* | 4/2021 | Sohn | G06N 3/0454 |
| 2021/0183022 A1* | 6/2021 | Wang | G06T 5/005 |
| 2021/0241041 A1* | 8/2021 | Mounsaveng | G06K 9/6256 |
| 2021/0272273 A1* | 9/2021 | Brauer | G06T 7/0006 |
| 2021/0279513 A1* | 9/2021 | Jie | G06K 9/6273 |
| 2021/0287128 A1* | 9/2021 | Han | G06K 9/628 |
| 2021/0303925 A1* | 9/2021 | Hofmann | G06K 9/6256 |
| 2021/0326650 A1* | 10/2021 | Jang | G06N 3/0454 |
| 2021/0383241 A1* | 12/2021 | Karras | G06N 20/00 |
| 2021/0383280 A1* | 12/2021 | Shaloudegi | G06F 17/16 |
| 2021/0397198 A1* | 12/2021 | Soltani Bozchalooi | G06K 9/6256 |
| 2022/0004882 A1* | 1/2022 | Budianto | G06N 3/088 |
| 2022/0027490 A1* | 1/2022 | Rahmat | G06F 21/6218 |
| 2022/0036152 A1* | 2/2022 | Yeo | G06N 3/04 |
| 2022/0036539 A1* | 2/2022 | Brauer | G06F 30/20 |
| 2022/0036564 A1* | 2/2022 | Ye | G06T 7/11 |

OTHER PUBLICATIONS

Written Opinion of the International Search Report in PCT/CN2020/118698, issued by ISA, dated Dec. 30, 2020.
Mode Collapse and Regularity of Optimal Transportation Maps, applied by lei Na etc, dated Feb. 8, 2019.
Generative Adversarial Networks, applied by Vincent Dumoulin etc, dated Oct. 19, 2017.
Training method of generative confrontation network based on feedback adjustment, applied by Qinwei Yao etc, dated Jun. 10, 2018.

* cited by examiner

ADVERSARIAL OPTIMIZATION METHOD FOR TRAINING PROCESS OF GENERATIVE ADVERSARIAL NETWORK

TECHNICAL FIELD

The invention relates to an image processing technology, in particular to an adversarial optimization method for the training process of generative adversarial network.

BACKGROUND

In recent years, as the core technology of artificial intelligence, deep learning has made a lot of key breakthroughs in the fields of image, speech, natural language processing and so on. Many different methods of generating adversarial examples have been proposed to attack deep neural networks. These methods involve directly calculating pixels of the gradient image, or directly solving for the optimization of the image pixels.

With the development of deep learning, it is used in more and more fields instead of traditional intelligent algorithms. However, high precision and low risk are required in some fields such as finance, unmanned vehicle and the like, which must have higher security, especially in automatic driving. Therefore, the impact of adversarial samples on the network model cannot be ignored. In deep learning networks, the adversarial samples affect a final learning model through subtle noise. In addition, the adversarial samples adopted by attackers cannot be judged by human senses, so that judgment and defence can be carried out only by the neural network itself. A typical scene contains adversarial samples of an image classification model. By superimposing carefully constructed variations on the image, a misjudgment is produced by the classification model as it is difficult for the naked eye to perceive.

In principle, a variance is calculated for a given sample in the adversarial samples. A deep learning model learns a segmentation plane in a high-dimensional space by training on samples, and different measurements on the segmentation plane serve as different classification discrimination results, as shown in FIG. 1.

One or more minor shifts cannot be identified by the human perception, but the samples can cross the segmentation plane in the deep learning result space, causing a change to a decision result of the machine learning model, as shown in FIG. 2.

So far, these optimization problems have been solved in three broad ways:

(1) by directly using optimizers such as L-BFGS or Adam (Kingma & Ba, 2015), such as Szegedy (2013) and Carlini & Wagner (2016), and these optimizer-based methods tend to be slower and more powerful than other methods.

(2) by technique approximation based on a single step gradient, such as a fast gradient sign (Goodfellow et al., 2014b) or a most unlikely class (Kurakin et al., 2016a). These methods are fast, requiring only a single forward and backward pass through target classifiers to compute the perturbation.

(3) by approximation of iterative variants based on gradient techniques (Kurakin et al., 2016a; MoosaviDezfooli et al., 2016a; b). According to these methods, multiple forward and backward passes through the target network are used to move the input more carefully toward the adversarial classification.

At present, the adversarial samples mainly launch a gradient attack and an encoder attack. Among them, the attack samples generated by the encoder of neural network are better than those generated by the gradient attack. Especially after 2017, with the development of generative adversarial network (GAN), GAN has gradually become a main network generation tool. Therefore, GAN-based attack sample models have emerged from 2018 to 2019. However, their model robustness is too poor because of the instability of GAN. Therefore, based on the optimal transmission theory, this invention addresses the convergence problem of GAN by optimal mapping in two measurements.

GAN is a generation model that contains two networks (a generator network and a discriminator network). At a given noise source, the generator network generates composite data, while the discriminator network distinguishes the generated data from the real data. However, GAN is affected by the instability of training Most of the latest work on GAN training is to find a stable training method. Currently, most of the commonly used methods rely on heuristics which are very sensitive to modification, and rarely explain this new unstable behavior for the generative adversarial network training from the internal source of the network. This greatly limits the applicability of GAN in image processing applications.

SUMMARY OF THE INVENTION

Aiming at the problem that the convergence of the training of the Generative Adversarial Networks (GANs) used for attack and defence is unstable, the invention provides an adversarial optimization method for the training process of generative adversarial network. The optimal transmission problem is transformed into solving the elliptic Monge-Ampere partial differential equation (MAPDE) in the generator G. To solve MAPDE of n (n>3) dimensions, the Neumann boundary conditions are improved and the discretization of MAPDE is extended to obtain the optimal mapping between a generator and a discriminator, which constitutes the adversarial network MAGAN. In the process of training the defence network, by overcoming the loss function of the optimal mapping, the defence network can obtain a maximum distance between the two measurements and obtain filtered security samples. The solution of MAPDE can constitute a new discriminant distribution function instead of the Wasserstein distance of WGAN.

The technical scheme of the invention is an adversarial optimization method for the training process of generative adversarial network, specifically comprising the steps of:

1) sending an image data training set and random noise into a generator in the generative adversarial network, taking generated data output by the generator as attack samples, putting the generated data and real data of the image data into two data sets X and Y, inputting the two data sets into a discriminator D in the generator, calculating probability densities $\rho X$ of X and $\rho Y$ of Y, and solving maximum likelihood estimation maximum values of the probability densities of the real data and the generated data; calculating the measurements of the real data and the generated data so as to solve a numerical solution of the elliptic Monge-Ampere partial differential equation, obtaining a best mapping between the real data distribution and the generated data distribution, training the generator by calculating a loss function of the generator, forming an attack network in the generator, and finally obtaining an optimal mapping U of the attack sample and the real data to complete the training of the attack network;

2) adding the discriminator D trained in the step 1) into a defence network in the generative adversarial network, sending the image data training set and the random noise into the generator in the generative adversarial network, taking the output data of the generator as input data of the defence network, training the defence network by a defence network loss function obtained by a solution of the Monge-Ampere PDE and an optimal transmission theory, and obtaining by the defence network a maximum distance between the two measurements by overcoming a loss function of the optimal mapping in the process of training the defence network; and finally obtaining an output value of the defence network by iterative training, namely filtered safety samples.

The generator has a loss function of $$L_D = E_{x \sim P_x}[D_w(G(x))] - E_{y \sim P_y}[D_w(G(y))] + \lambda E_{\tilde{x}}(|\nabla XD(x)|_2 - 1)^2,$$

wherein x and y correspond to points within the sets X and Y; $E_{x \sim P_x}$ is an expectation of the probability distribution of real data; $E_{y \sim P_y}$ is an expectation of probability distribution of attack sample data; $E_{\tilde{x}}$ is an expectation for Licpschiz continuous data; $D_w$ is a discriminator network with weights; D is a discriminator network; G is a generator network; λ is a penalty coefficient, a hyper-parameter set by the training network, and E is an expectation;

the defence network has a loss function of $$L_{Defence} = \sum_{i=1}^{m} y \log y + (1-y) \log(1-y),$$

wherein m is the number of discrete points in each dimension of the network.

The invention has the beneficial effects that the invention generates an adversarial optimization method for the training process of generative adversarial network, an effective attacking method of GANs is successfully established, and several calculation operators are provided to prove that the precision is improved by 5.3%. In addition, MAGAN can be stably trained without adjusting hyper-parameters, and the convergence speed of the MAGAN is 317.2% faster than that of the WGAN-GP in the LSUN Bedrooms database. The IS value of MAGAN on a CIFAR-10 data set also reaches 8.7, which improves the accuracy of target classification and recognition system for unmanned vehicle.

DETAILED DESCRIPTION OF THE PREFERRED EMBODIMENTS

Figure 1:
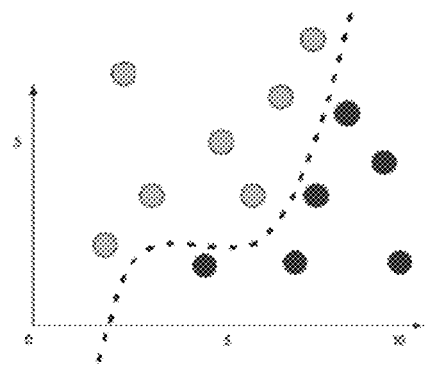
FIG. 1 is a schematic diagram of a neural network classification segmentation plane.
Figure 2:
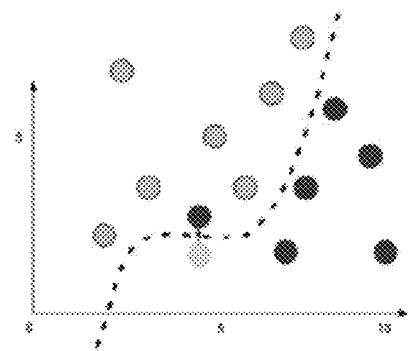
FIG. 2 is a schematic diagram of an attack sample cross-domain segmentation plane.

In order to assist and realize unmanned vehicle, the neural network implements an algorithm recognition part of an unmanned vehicle target classification and a recognition system for image recognition and classification. Convolution neural network (CNN) is mainly used in image processing and target recognition, and under-fitting exists in the space of real data and generated data. Therefore, the proposed attack and defence algorithm has been studied to enhance the robustness of neural networks, but the black-box attack and defence effect is not good.

In order to solve the problem, a homeomorphism mapping from a region to itself is searched, meeting two conditions of preserving measurements and minimizing transmission cost. According to the preserving measurements, E ⊂ Q for all Boyle sets (Ω is a finite open set). The mapping T maps a probability distribution μ to a probability distribution v, denoted as T*μ=v. The transmission cost of optimal transmission mapping T: Ω→Ω is defined as:

$$I[s] = \int_X c(x, s(x))dx, \quad (1)$$

$$c(x, y) = \frac{1}{2}|x - y|^2, \quad (2)$$

wherein I is a mapping cost function; c (x, y) is a distance for mapping x to y; and x, y belong to points within the set.

In this case, Brenier proves that there is a convex function u: Ω→R (R is a set of all real numbers), whose gradient mapping T: x→∇u (x) is the only optimal transmission mapping. This convex function is called Brenier potential. The Jacobian equation gives that the Brenier potential satisfies the Monge-Ampere PDE (2), and the Jacobian matrix of the gradient mapping is the Hessian matrix of the Brenier potential.

$$\det(D2u(x)) = \frac{\rho_X(X)}{\rho_Y(\nabla u(X))}, \text{ for } x \in X, \quad (3)$$

$$\nabla u: X \to Y, \quad (4)$$

wherein D is a partial derivative; det is a determinant; p is a measurement; X and Y are complete sets of x and y, respectively.

According to the Kantorovich theorem, WGAN transforms the original function into the dual problem. However, the constraints of the dual problem are difficult to implement, so sometimes WGAN still produces poor samples or even fail to converge. Therefore, the method of Kantorovich is not a good choice. This has prompted the need for more complex methods to efficiently compute the optimal mapping. Brenier's method is chosen to obtain the best mapping between the actual data distribution and the generation distribution. In the case where the transmission cost is the difference square, the problem can be transformed into solving the Monge-Ampere PDE. The Monge-Ampere PDE can avoid Lipschitz constraints completely. For the optimal transmission problem, the scheme of the Monge-Ampere PDE is more accurate than the method of Kantorovich (WGAN-GP).

In the optimal transmission problem between convex sets, the transmission condition (BC) is also named the second boundary value problem or the second kind of boundary condition. The boundary conditions can be mapped into the set X by boundary nodes, and Y by the boundary nodes. In view of the gradient appearing in the transmission boundary condition, it is expected to find the Neumann boundary conditions:

$$\frac{\partial u}{\partial n} = \phi(x), x \in \partial X, \tag{5}$$

$$\vec{n} = (\vec{n}_1, \vec{n}_2, \ldots, \vec{n}_n), \tag{6}$$

$$\nabla u(x_{i_1, \ldots, i_n}) \cdot n \approx \tag{7}$$

$$n_1 \frac{u(x_{(i+1)_1, \ldots, i_n}) - u(x_{i_1, \ldots, i_n})}{\delta x} + n_2 \frac{u(x_{i_1,(i+1)_2, \ldots, i_n}) - u(x_{i_1, \ldots, i_n})}{\delta x} + \ldots + n_n \frac{u(x_{i_1, \ldots, (i+1)_n}) - u(x_{i_1, \ldots, i_n})}{\delta x}.$$

According to the equation (5), a boundary normal vector n is defined, wherein normal vector components corresponding to n dimensions in the boundary normal vector n are $n_1$, $n_2$, ..., $n_n$, where the vector n is perpendicular to the point x (x belongs to a point in the set X because the set X has a boundary, and an unspecified point x on the boundary is also in the set X Therefore, the equation 5 is the boundary conditions meeting the condition, the domain of definition is also X, and x is just the point in the met condition.), $\partial X$ is the boundary of the set X, and $\delta x$ solves a partial derivative with respect to x. $\phi$ is a normal vector calculation function, calculated by the equation (7). The normal vector component n corresponding to each dimension in the equation (7) will be multiplied by the partial derivative of u in the corresponding dimension, i.e., a difference value between one unit step by which the function u is shifted forward in each dimension and a center value.

X is n-dimensional, so there are n subscripts for $x_{i_1, \ldots, i_n}$, i.e., $i_1, i_2, i_3, \ldots i_n$, n in total, representing different dimensions. Because the numerical solution needs to be discretized, there are m discrete points in each dimension, i.e., i={1, 2, 3, ..., m}. The front and back points, i.e., i+1 and i, are needed to calculate the difference by the five-step method. Assuming that in dimension 1, the subscripts of the front and back points are $i_1$, $(i+1)_1$, i.e. $x_{i_1, \ldots, i_n}$ and $x_{(i+1)_1, \ldots, i_n}$. Rule: the subscript x in the first term u takes backwards, in turn, a next unit step i+1 in dimension.

Figure 3:
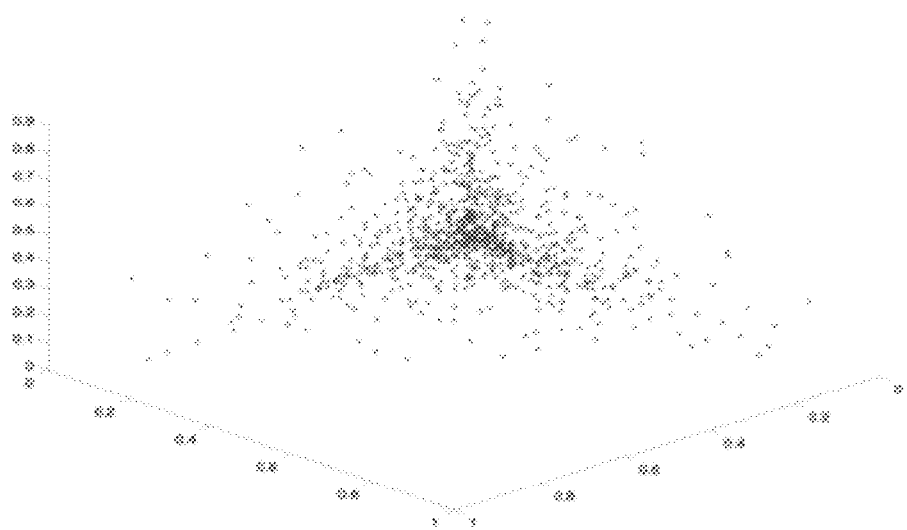
FIG. 3 is a distribution diagram of a numerical initial solution of MAPDE.
Figure 4:
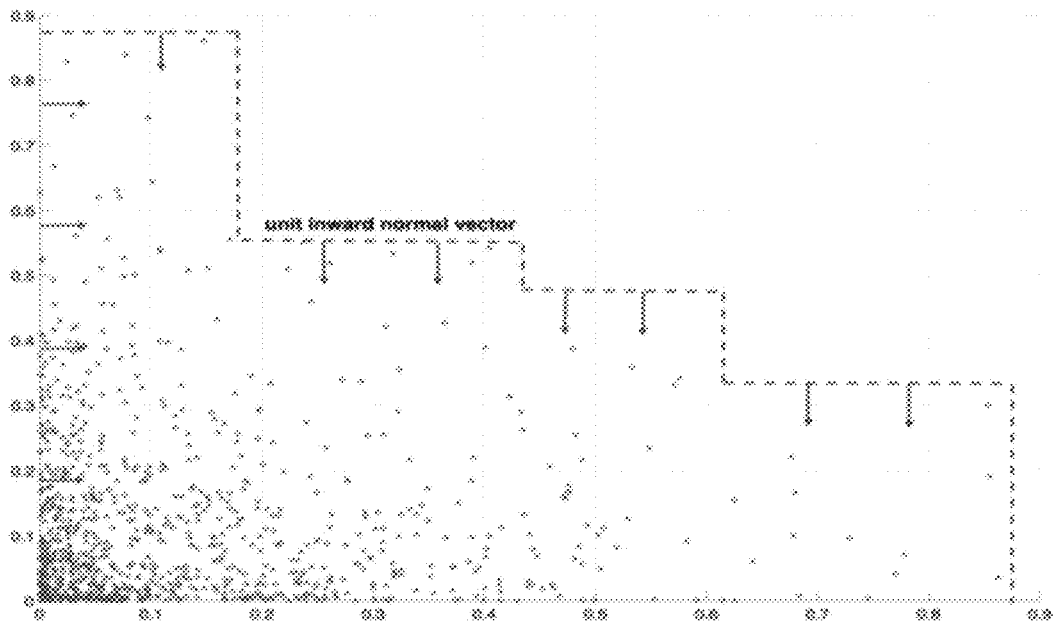
FIG. 4 is a schematic diagram of a unit inward normal vector of MAPDE under Neumann boundary conditions.

This updated boundary conditions are used to solve the Monge-Ampere PDE again to obtain a new numerical solution. $u^{k+1}$ is a solution of the k+1 iteration. Because it is monotonic, the scheme relies only on values within a square. When the dimension of MAPDE is greater than 2, there are many nodes around the boundary that directly affect the value of the solution, as shown in FIG. 3. This will take more computational time, so more attention should be paid to the boundary, and upper limits of these monotonic methods should be used for all acceptable ranges to ensure that a highly accurate numerical solution is obtained. The monotonicity of the method is preserved. First, a boundary is set on the other side of the square area. Then, at the corners, the derivation directions in the other dimensions are limited in the form of tilt constraints. Also, limiting the allowed direction to a single quadrant ensures that the required information will continue to remain within the square area. Next, a new approximation is obtained in an inward direction. Finally, as shown in FIG. 4, the above steps are repeated until a suitable boundary is obtained, which corresponds to considering all supporting hyperplanes at these points.

The present invention defines several finite difference operators that are used to approximate the first and second order partial derivatives using the central difference value. Standard discretization is performed to the equation by the center difference:

$$MA_s^h[u] = (D_{x_1x_1}u)(D_{x_2x_2}u) - (D_{x_1x_2}u)2 - f(x)/g(D_{x_1}u, D_{x_2}u) \tag{8}$$

MA is a discrete Monge-Ampere PDE; D is a partial derivative; and f g are measurements. U is a discrete numerical solution to the Monge-Ampere PDE.

The finite difference operator is $$[D_{x_1x_1}u]_{ij} = \frac{1}{h^2}(u_{i+1,j} + u_{i-1,j} - 2u_{i,j}) \tag{9}$$

$$[D_{x_2x_2}u]_{ij} = \frac{1}{h^2}(u_{i,j+1} + u_{i,j-1} - 2u_{i,j})$$

$$[D_{x_1x_2}u]_{ij} = \frac{1}{4h^2}(u_{i+1,j+1} + u_{i-1,j-1} - u_{i-1,j+1} - u_{i+1,j-1})$$

$$[D_{x_1}u]_{ij} = \frac{1}{2h}(u_{i+1,j} - u_{i-1,j})$$

$$[D_{x_2}u]_{ij} = \frac{1}{2h}(u_{i,j+1} - u_{i,j-1}).$$

Along these directions $v=(1/\sqrt{2}, 1/\sqrt{2})$ and $v^\perp=(1, \sqrt{2}, -1/\sqrt{2})$, the finite difference operator is further computed:

$$[D_{vv}u]_{ij} = \frac{1}{2dx^2}(u_{i+1,j+1} + u_{i-1,j-1} - 2u_{i,j}) \tag{10}$$

$$[D_{v^\perp v^\perp}u]_{ij} = \frac{1}{2dx^2}(u_{i+1,j+1} + u_{i+1,j-1} - 2u_{i,j})$$

$$[D_v u]_{ij} = \frac{1}{1\sqrt{2}\, dx}(u_{i+1,j+1} - u_{i-1,j-1})$$

$$[D_{v^\perp} u]_{ij} = \frac{1}{1\sqrt{2}\, dx}(u_{i+1,j-1} - u_{i-1,j+1}).$$

The result of discretization is the variational form of MA operator, and an additional term is added to the expression to further punish non-convexity:

$$\det^+(D^2 u) = \min_{(v_1, \ldots, v_d) \in V} \left\{ \prod_{j=1}^d \max\{u_{v_j v_j}, 0\} + \sum_{j=1}^d \min\{u_{v_j v_j}, 0\} \right\}. \tag{11}$$

The partial derivatives of all nodes need to be calculated on the basis of Newton iteration. However, when the dimension is greater than 3, it is difficult to obtain all the partial derivatives in the high dimension. Although the solution of MAPDE can be discretized by setting a variable, the high dimension also makes it difficult for nodes in the grid to define the sequence of the nodes. It can be found that most relevant nodes in each dimension are its forward and backward nodes. The nodes with the central difference in different dimensions are the same node. Therefore, it is suggested to use the surrounding gradient instead of the overall gradients in order to accelerate the high-dimensional convergence.

An iterative expression of MAPDE under Neumann boundary conditions and an initialization expression at the beginning of solving the equation can be obtained:

$$u^{n+1} = u^n - \nabla F(u^n)^{-1} F(u^n), \quad (12)$$

$$\nabla F(u^n)^{-1} = \sum_{j=1}^{d} \text{diag}\left(\prod_{k \neq j} D_{v_k^* v_k^*} u\right) D_{v_j^* v_j^*}. \quad (13)$$

MAPDE can be solved to obtain the best mapping u(x) between the actual data distribution and the generation distribution. Then, according to the following equation, a cost function for the OT problem can be obtained, which can train the generator how to efficiently generate real data. Equation 14 is maximum likelihood estimation for solving the real data and the generated data, and the maximum value of Equation 15 is solved by MLE to determine the distribution of the real data and the generated data.

$$L(\theta; y) = f(y_1; \theta) f(y_2; \theta) \ldots f(y_T; \theta) = \prod_{t=1}^{T} f(y_t; \theta) \quad (14)$$

$$\text{Loss} = \max\left\{\ln \prod_{i=1}^{k} v(x_k)\right\} = \max\left\{\prod_{i=1}^{k} \ln v(x_k)\right\} \quad (15)$$

Figure 5:
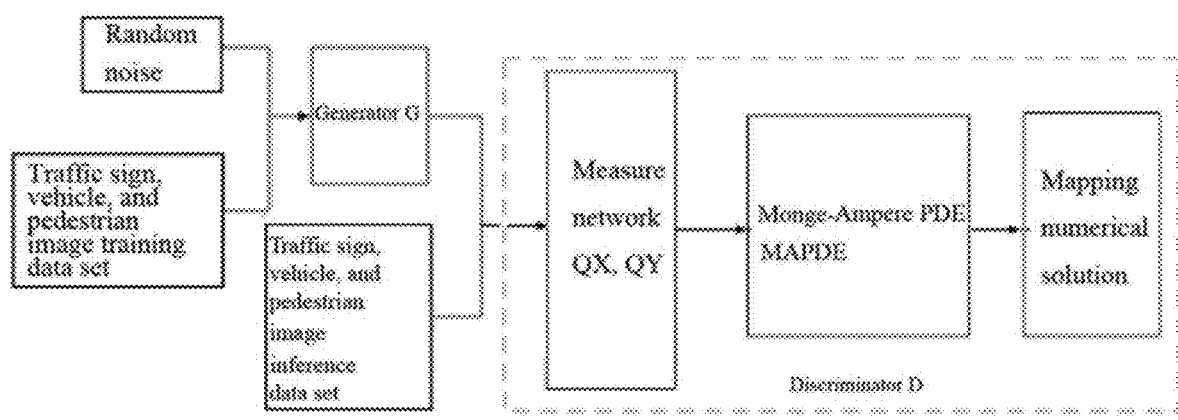
FIG. 5 is a frame structure diagram of an improved generative adversarial network according to the present invention.

The best mapping u(x) is obtained by solving the Monge-Ampere PDE, as shown by a dashed rectangle in FIG. 5.

An image data training set and random noise are sent into a generator, and the generator outputs data as attack samples and real image data, correspondingly obtaining a brand-new discriminator D formed by entering two data sets X and Y into a dashed rectangle. The brand-new discriminator D distinguishes the measurement of the real data from the measurement of the generated data, and the generator G continuously confronts the discriminator D in the training process, thereby performing effective attacks. The best mapping u(x) is obtained by solving the Monge-Ampere PDE, and the generation of attack adversarial samples is achieved by the trained generator G in FIG. 5. That is, the interior of the generator constitutes the attack network. In the process of training the discriminator D shown in FIG. 5, the upper bound of the loss function of the generator of the equation 16 will be solved; on the contrary, in the process of training the generator G shown in FIG. 5, the lower bound of the loss function of the generator of the equation 16 will be solved, finally achieving a good adversarial effect. The loss function, as a new divergence, of the Monge-Kantorovich transmission problem replaces the Wasserstein distance of WGAN.

At the start of the training, only the real data of the image is used to obtain the probability density PX of X The probability density ρY of the attack sample Y causes the generation distribution $P_g$=the real data distribution $P_r$, generated data, since the solution of MAPDE causes $P_g$ to tend towards $P_r$. The appropriate boundary can then be calculated by the equation (13) using $P_r$ and $P_g$ according to the Neumann boundary conditions. Next, the equation set F[u]= 0 is obtained by using the finite difference method (FDM) and solved by the Newton iteration method.

Algorithm 1 Monge-Ampere Adversarial Network Training Process

Requirements: Adam optimizer hyper-parameters α, β1, and β2; evaluation iteration number N of each generator iteration; a finite step size difference method h with a batch M;
    Output: a trained generator parameter θ;
    1: while θ does not converge, do
    2: for i = 1; i < N; i + + do
    3: calculate the probability density ρX of X and the probability density ρY of Y
    4: L(θ; y) = $\sup_{\theta \in \Theta}$ L(θ; y)

5:
$$\hat{\ell}(\theta; x) = \frac{1}{n} \sum_{i=1}^{n} \ln f(x_i \mid \theta);$$

6: compute the boundary $\frac{\partial u}{\partial n} = \phi(x), x \in \partial X$ 7: calculate the optimal u(x) between the real data distribution $P_r$ and the generation distribution $P_g$
8: un+ 1 = un − ∇F (un)−1 F (un)

9:
$$\nabla F(u^n)^{-1} = \sum_{j=1}^{d} \text{diag}\left(\prod_{k \neq j} D_{v_k^* v_k^*} u\right) D_{v_j^* v_j^*}$$

10: use the cost function of the Monge-Kantorovich transmission problem to train the generator
11: I[s] = $\int_X$ c(x,s(x))dx
12: end for
13: end while Implementation steps include:
Step 1, calculating the probability density ρX of X and the probability density ρY of Y
Step 2, solving maximum likelihood estimation maximum values of the real data and the generated data;
Step 3, calculating the measurements of the real data and the generated data;
Step 4, calculating the first type of boundary of the MAPDE;
Step 5, calculating the optimal u(x) between the real data distribution $P_r$ and the generation distribution $P_g$;
Step 6, iterating gradient values;
Step 7, calculating the loss function;
Repeat the steps until the cost function converges.

Figure 6:
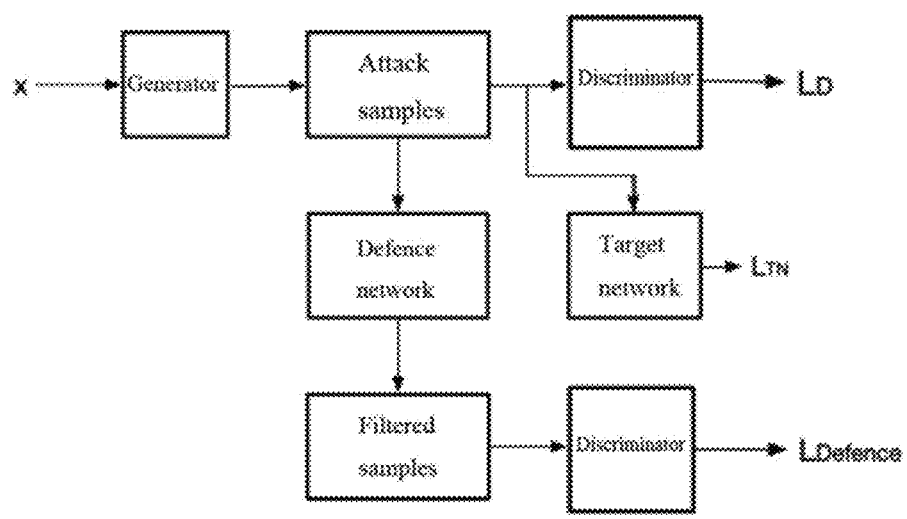
FIG. 6 is a structure diagram for generative adversarial samples and defence networks according to the present invention.

This network is applied in an adversarial sample generation network by MAGAN. As shown in FIG. 5, a black-box attack and a white-box attack are realized more efficiently by good robustness of the MAGAN, forming an attack network. In order to better defend against attacks from the adversarial samples, the defence network is trained by the attack samples generated by the generator G, and the robustness is enhanced by the solution of the Monge-Ampere PDE, as shown in FIG. 6. The discriminator D in FIG. 6 corresponds to the structure in a dashed box in FIG. 5, which contains a numerical solution of the partial differential equation. When the discriminator is trained and applied to a lower discriminator network of FIG. 6, the filtered samples are used for training the defence network. The samples of the generator G are taken as the input data of the defence network, and since the input training data has strong robustness of black-box and white-box attacks, the cross entropy is calculated by logistic regression on the input data by means of the loss function of the defence network, the real data and the artificial data are distinguished, achieving an isolation effect and a good defence effect.

The loss function for the generator is $$L_D = E_{x-P_x}[D_w(G(x))] - E_{y-P_y}[D_w(G(y))] + \lambda E_{\bar{x}}(|\nabla x D(x)|_2 - 1)^2 \quad (16),$$

wherein x and y correspond to points within the sets X and Y; $E_{x-P_x}$ is an expectation of the probability distribution of real data; $E_{y-P_y}$ is an expectation of probability distribution of attack sample data; $E_{\bar{x}}$ is an expectation for Licpschiz continuous data; $D_w$ is a discriminator network with weights; D is a discriminator network; G is a generator network; λ is a penalty coefficient, a hyper-parameter set by the training network, and E is an expectation;

the defence network has a loss function of $$L_{Defence} = \sum_{i=1}^{m} y\log y + (1-y)\log(1-y) \quad (17)$$

Figure 7:
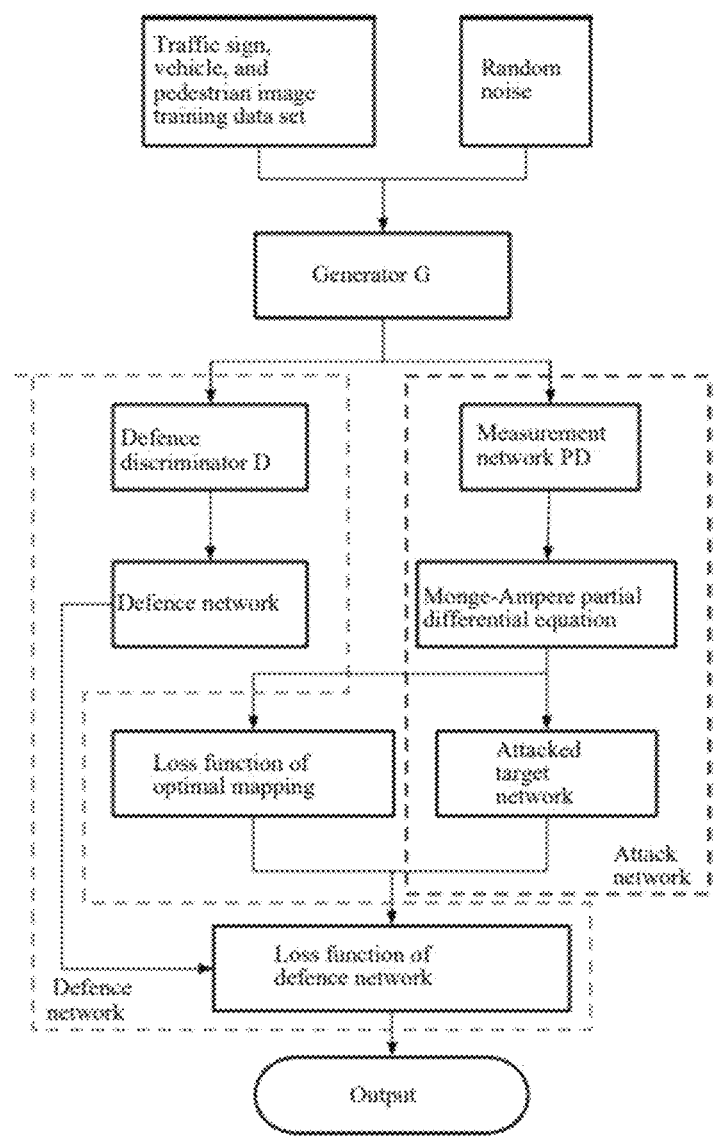
FIG. 7 is a flow chart for attacking and defending a neural network of a target classification and a recognition system for unmanned vehicle according to the present invention.

When the attack network in FIG. 5 is trained, the defence network in FIG. 6 is implemented by adding an attacked target network, as shown in FIG. 7. In the right box of FIG. 7, by setting the loss function of the generator, the generator G can learn the measurements of the attack samples to calculate the optimal mapping U. Then the generator can obtain attack samples of the target network according to the input data and the random noise so as to carry out effective attacks. The target network is a network required to be attacked, i.e. a known network trained by others. In the left box of FIG. 7, the output data of the generator G is taken as the input data of the defence network, and the defence network is trained according to the loss function (equation 17) obtained from the solution of the Monge-Ampere PDE and the optimal transmission theory in the right box. The equation 16 is a generator network. When the defence network is trained, the loss function of the generator does not participate in the training. In the process of training the defence network, by overcoming the loss function of the optimal mapping, the defence network can obtain a maximum distance between the two measurements. Finally, the output values of the defence network can be obtained by iterative training, and the target classification and recognition system for unmanned vehicle can be well helped to judge the attack samples.

The invention claimed is:

1. An adversarial optimization method for a training process of a generative adversarial network, comprising the steps of:
   1) sending an image data training set and random noise into a generator in the generative adversarial network, taking generated data output by the generator as attack samples, putting the generated data and real data of the image data into two data sets X and Y, inputting the two data sets into a discriminator D in the generator, calculating probability densities ρX of X and ρY of Y, and solving maximum likelihood estimation maximum values of the probability densities of the real data and the generated data; calculating measurements of the real data and the generated data so as to solve a numerical solution of an elliptic Monge-Ampere partial differential equation (PDE), obtaining a best mapping between the real data distribution and the generated data distribution, training the generator by calculating a loss function of the generator, forming an attack network in the generator, and finally obtaining an optimal mapping U of the attack sample and the real data to complete the training of the attack network;
   2) adding the discriminator D trained in the step 1) into a defence network in the generative adversarial network, sending the image data training set and the random noise into the generator in the generative adversarial network, taking the output data of the generator as input data of the defence network, training the defence network by a defence network loss function obtained by a solution of the Monge-Ampere PDE and an optimal transmission theory, and obtaining by the defence network a maximum distance between the two measurements by overcoming a loss function of the optimal mapping in the process of training the defence network; and finally obtaining an output value of the defence network by iterative training which comprises filtered safety samples.

2. The adversarial optimization method for the training process of generative adversarial network according to claim 1, wherein the loss function of the generator is $$L_D = E_{x-P_x}[D_w(G(x))] - E_{y-P_y}[D_w(G(y))] + \lambda E_{\bar{x}}(|\nabla x D(x)|_2 - 1)^2$$

wherein x and y correspond to points within the sets X and Y; $E_{x-P_x}$ is an expectation of the probability distribution of real data; $E_{y-P_y}$ is an expectation of probability distribution of attack sample data; $E_{\bar{x}}$ is an expectation for Licpschiz continuous data; $D_w$ is a discriminator network with weights; D is a discriminator network; G is a generator network; λ is a penalty coefficient, a hyper-parameter set by the training network, and E is an expectation; the defence network has a loss function of $$L_{Defence} = \sum_{i=1}^{m} y\log y + (1-y)\log(1-y)$$

where m is the number of discrete points in each dimension of the defence network.

* * * * *